May 27, 1941.   T. TACHI   2,243,657
TOOL FOR CUTTING FRUIT
Filed April 30, 1940   2 Sheets-Sheet 2
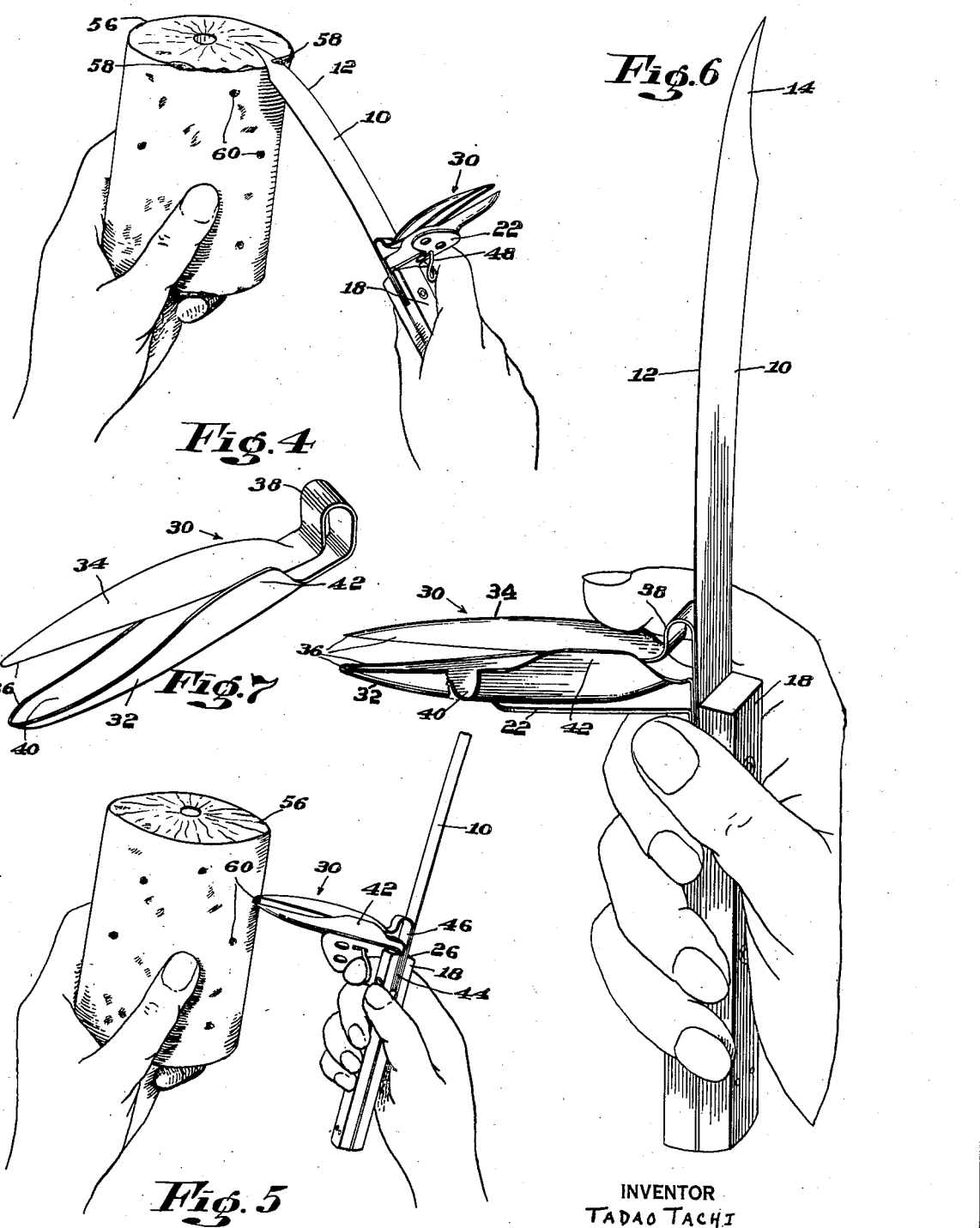
INVENTOR
TADAO TACHI
BY
Edgar H. Kent
ATTORNEY Patented May 27, 1941

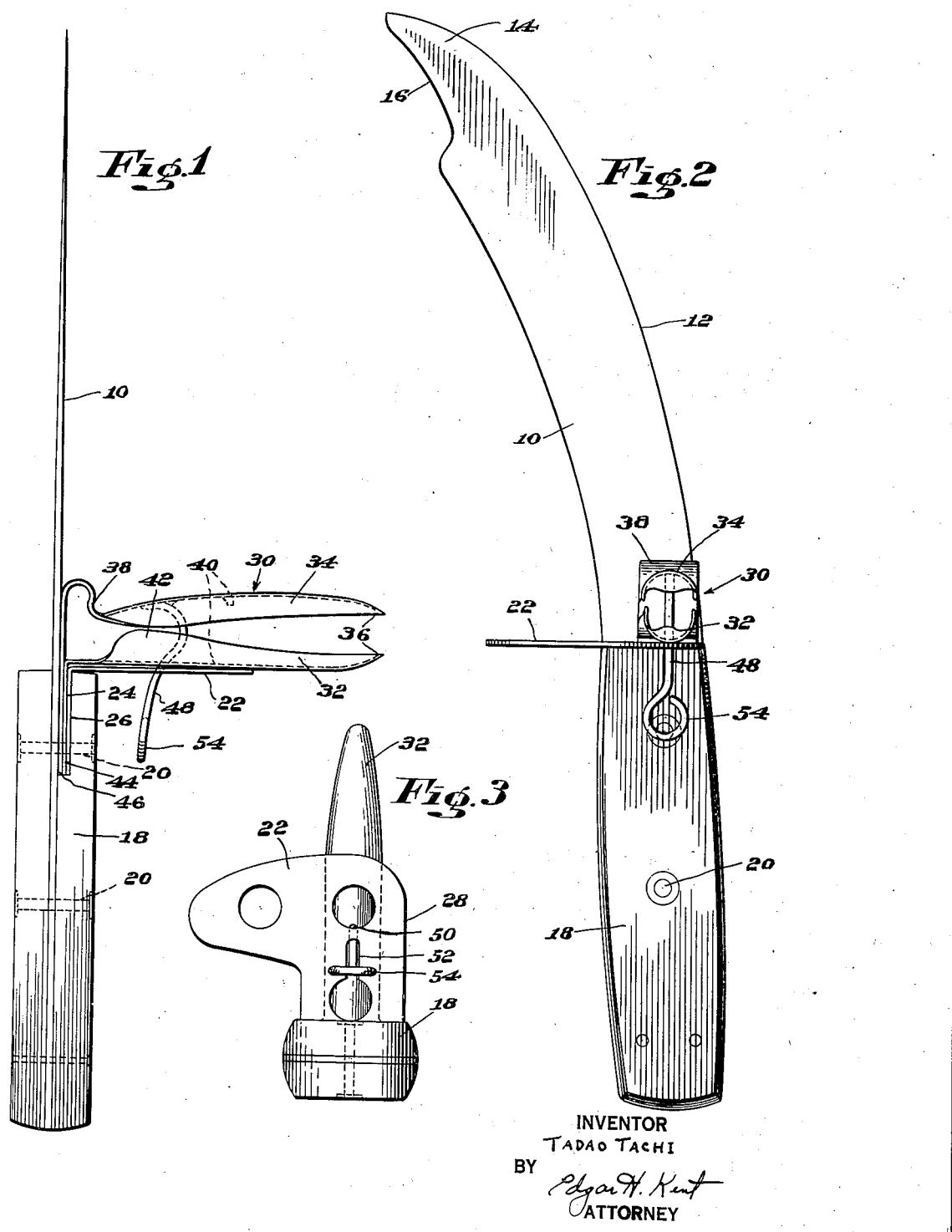

2,243,657

UNITED STATES PATENT OFFICE 2,243,657

TOOL FOR CUTTING FRUIT

Tadao Tachi, Honolulu, Territory of Hawaii, assignor to Hawaiian Pineapple Company, Limited, Honolulu, Territory of Hawaii, a corporation of Hawaii Application April 30, 1940, Serial No. 332,439

5 Claims. (Cl. 30—142)

This invention relates to tools for preparing fruit, particularly pineapples, for canning, and more particularly to tools for excising shells, eyes, damaged spots and the like from the fruit.

In preparing pineapples for canning, they are first subjected to the action of sizing and coring machines which form the fruit into a cylinder by removing the shell and trimming off the butt and crown, and which also remove the core. The cored fruit cylinders produced by these machines are not entirely clean, having some parts of the shell remaining, particularly near the ends, and also eyes and damaged spots, which must be removed preliminary to slicing and packing.

This cleaning of the fruit cylinders after sizing and coring is done manually and heretofore the operators have been provided, for this purpose, with a knife having a blade with a relatively long cutting edge for trimming off the shell portions or other surface blemishes of the pineapple cylinders, the blade having a narrow curved point at the end with which the eyes or deep seated damaged spots may be gouged out. This tool, although generally satisfactory as a means for trimming off surface blemishes, has proved less efficient for removing deep seated portions such as the eyes, the use of the tip in a gouging action, as contemplated, being somewhat clumsy and difficult and usually resulting in the removal, cutting or damaging of considerable areas of good fruit around the eye or bad spot, with consequent reduction in potential recovery of whole slices of fruit per cylinder.

An object of the present invention is to provide a novel tool with which pineapple eyes and bad spots may be quickly and easily excised without injury to the surrounding areas of good fruit. A further object of the invention is to provide such a tool which is also adapted for trimming off shells or surface blemishes and which may be employed for cleaning up cored and sized pineapple cylinders preliminary to slicing and packing more rapidly and easily and with less wastage of good fruit than previously known tools. Other objects and advantages of the invention will appear from the ensuing more particular description and from the appended drawings wherein:

Fig. 1 is an edge view of a novel fruit trimming and eye extracting tool of the invention;

Fig. 2 is a side view of the tool shown in Fig. 1;

Fig. 3 is an end view of the tool shown in Fig. 1, taken from the handle end;

Figs. 4 and 5 are perspective views of a sized pineapple cylinder and the tool shown in Figs. 1–3, illustrating, respectively, the manner of use of the tool in trimming off shell portions or surface blemishes and in excising eyes or deep seated bad spots.

Fig. 6 is a perspective view of a modified form of tool, illustrating manipulation of the eye extractor, part of one of the eye extractor jaws being broken away; and Fig. 7 is a perspective view of an eye extractor device of the invention, not attached to a trimming knife.

Referring first to the embodiment illustrated in Figs. 1 to 5 of the drawings, 10 represents a metal knife blade provided with a cutting edge 12, the blade having a curved outer end 14. The upper part of the curved end 14 of the blade may, if desired, be cut away and sharpened, as shown at 16, to form a hooked point, sharpened at both edges, such as was formerly used for the purpose of gouging out the eyes and bad spots, and is useful in trimming certain parts of the surface of the fruit cylinder, particularly at the ends. Blade 10 is provided at the other end with a handle 18 which may conveniently, as shown, be formed of two half pieces of wood secured together and to the blade 10 by rivets 20 passing therethrough and through the hilt of the blade.

At the end of handle 18 adjacent the cutting edge of the blade there is mounted a guard 22 extending at right angles to the plane of the blade sufficiently beyond the side of the handle to prevent the operator's fingers slipping off the handle into contact with the knife edge. This guard 22 may be of metal and, as shown, may be provided with a projecting tongue 24 adapted to lie flat over the blade 10 and to enter a slot 26 in the adjacent end of the handle where it is fastened by one of the rivets 20. As shown, the guard extends out from one side only of the blade, corresponding to the side of the handle that is gripped by the fingers, and has one edge 28 extending slightly beyond the cutting edge of the blade, this form of guard having been found adequate for safety purposes.

Knife blade 10, as just described, is adapted and intended for trimming the surface of the fruit. According to the invention, the tool is also provided with an eye extractor device, indicated generally by the reference numeral 30, constructed and located on the tool that it may be readily operated for its intended purpose without necessity for changing the grip on the tool.

The eye extractor means 30, shown separate from the knife in Fig. 7, is a forceps-like device comprising a pair of joined oppositely disposed jaws 32 and 34, preferably of thin metal, these jaws having cutting edges 36 at their unjoined ends and preferably also at their sides as shown, and being adapted to be inserted endwise at opposite sides of a pineapple eye and pressed toward each other, thus excising the eye from surrounding fruit and clamping it for withdrawal by a straight outward pull on the clamped jaws. The extractor device may be formed of a single piece of metal suitably bent and shaped, as in Fig. 7, or may be of separate pieces fastened together or to a connecting element as in the other figures of the drawings.

The jaws 32 and 34 are preferably spring-pressed apart to separate their outer ends for a distance substantially greater than the diameter of the average pineapple eye. In the embodiments illustrated, this spring pressure is provided by suitably bending the inner end of the jaw 34 as at 38.

Preferably, as shown in the several figures of the drawings, the sides of the jaws 32 and 34 are bent up or turned to form, longitudinally of the inner face of each jaw, an open channel 40 gradually increasing in depth from the outer tip of the jaw toward its opposite end, this turning of the sides of the jaws serving also to bring the cutting edges 36 at corresponding sides of each jaw into substantially the same plane. With this preferred form of jaw, the distance between the jaw tips is adjusted to the diameter of the eye and the jaws are then inserted endwise into the fruit at opposite sides of the eye while closing pressure is maintained on the jaws. As the ends of the jaws approach the inner smaller end of the eye the jaws close around the eye, their sharpened side edges 36 cutting through the softer fruit at the sides of the eye, until the ends of the jaws pass under the inner end of the eye. The eye is then substantially completely excised from the fruit and is clamped between the jaws, the larger outer part of the eye lying within the more deeply channeled part of the jaws. A light outward pull on the forceps removes the eye, leaving a clean aperture having the same shape as the eye and only slightly larger, the fruit around the aperture being undamaged.

As best shown in Figs. 6 and 7, the sides of the jaw 32 may be extended upwardly near its inner end as at 42, these extended portions 42 being flared outwardly to form a socket for guiding the jaw 34 into proper alignment with jaw 32 as it is pressed toward it.

Preferably, as shown in Figs. 1 to 6, the extractor means 30 is attached to a trimming knife to form a unitary trimming and eye extracting tool. In Figs. 1 to 6, the extractor means is shown secured to the knife with the jaws 32 and 34 projecting from one side of the knife blade 10 at substantially right angles thereto adjacent the handle 18 and guard 22, the ends of the jaws protruding substantially beyond the outer edge of the guard. The side of the blade 10 from which the extractor projects corresponds to the side of the handle which is gripped by the fingers. This location of the extractor with reference to the knife blade, handle, and guard is preferred because it does not interfere in any way with the use of the tool for trimming the surface of the fruit and at the same time can be easily manipulated for eye extraction purposes without changing the grip on the tool.

The extractor may be secured to the tool in any convenient manner. In Figs. 1 to 6, jaws 32 and 34 are shown as formed of separate metal strips having bent over ends, indicated respectively at 44 and 46, which are inserted in the slot 26 in the end of handle 18 and there secured by one of the rivets 20. Preferably, the extractor jaw closest to the handle (jaw 32 in the drawings) is soldered or otherwise secured to the guard 22 so that it is substantially rigid and immovable, while the other jaw 34 is movable toward and away from the fixed jaw 32 to close and open the jaws, being spring-pressed away from the fixed jaw 32 by its curved metal portion 38 adjacent the knife blade 10.

With a tool constructed as so far described, as illustrated in Fig. 6, the operator can manipulate the jaws of the extractor 30 with the forefinger while the other fingers and the thumb retain their grasp of the handle, it being merely necessary to extend the forefinger beyond the guard 22 around the outer jaw 34 of the extractor so that by cramping the finger, jaw 34 will be pressed toward jaw 32 and, by extending the finger, jaw 34 will be released and forced away from the jaw 32 by the spring 38.

While the tool in the form illustrated in Fig. 6 can be satisfactorily operated for eye removal purposes as just described as well as for trimming, I prefer to employ the form shown in Figs. 1–5 wherein there is attached to the outer jaw 34 an operating lever 48, extending rearwardly from said jaw 34 through a slot 50 in jaw 32 and a similar slot 52 in guard 22 and terminating in a flat extension or finger-piece 54 above the side of the handle 18. Lever 48 is sufficiently rigid so that by pressing finger-piece 54 toward the handle the resistance of spring 38 is overcome causing jaw 34 to move toward jaw 32.

In use, as illustrated in Figs. 4 and 5, the operator holds the fruit, such as the cored and sized pineapple cylinder 56, with one hand and grasps the tool with the other, curling the fingers around the extractor side of the handle 18, back of the guard 22 and pressing the thumb against the opposite side of the handle. To trim shells or blemishes 58 from the surface of the fruit, the blade 10 is held at a slight angle to the surface of the fruit and the cutting edge 12 is forced under the shell or blemish away from the operator, as illustrated in Fig. 4. To remove an eye or deep seated bad spot 60, as illustrated in Fig. 5, the knife blade is rotated some 130 degrees or so from its trimming position by turning the hand palm up so that the extractor means 30 projects toward the fruit, the spacing between the jaws 32 and 34 is adjusted by manipulating the lever 48 with the forefinger, and the ends of the jaws are located at opposite sides of the eye or spot 60. The jaws are then forced into the fruit by lateral pressure exerted on handle 18 and lever 48 is pressed toward handle 18 until the base of the eye or bad spot is reached and the jaws are substantially closed around it. The tool is then pulled away from the fruit with the excised eye or bad spot held clamped between the jaws by pressure of the finger on lever 48.

The operation of the form of tool shown in Fig. 6 is the same as just described with reference to the embodiment of Figs. 1–5 with the exception, previously noted, that the jaws of the extractor are operated by curling the forefinger around the outer jaw 34. The construction of Figs. 1–5 is somewhat preferred to that of Fig. 6 since operation of the extractor is easier and does not require extension of the forefinger beyond the guard where it may become cut by the blade edge 12.

It will be seen that the location of the extractor means 30 is such that it does not interfere in any way with the use of the tool for surface trimming and that it may be quickly and easily brought into operative position and manipulated by turning the wrist without changing the grip.

While I prefer to use the novel eye extracting means of the invention as a part of a trimming tool adapted for trimming off shells and surface blemishes as well as for eye extraction, it will be understood that it is not necessarily so utilized but may comprise a separate tool. Such tool may have the form illustrated in Fig. 7 wherein it comprises simply the jaws 32 and 34 formed from a suitably bent and shaped metal strip, adapted to be held in the hand and operated by pressing the jaws between thumb and fingers, or may be provided with a handle and operating trigger, as by simply omitting the knife blade 10 from the embodiment of Figs. 1–5.

It will be understood that various changes may be made in the preferred embodiments described and illustrated herein without departing from the spirit and scope of the invention.

I claim:

1. A tool for trimming shells and extracting eyes from fruit and for like uses comprising a trimming knife having a handle and an elongated blade projecting therefrom, a cutting edge on said blade, and a pair of opposed forceps-like eye extractor jaws secured to said knife and projecting outwardly from one side of the knife adjacent the blade end of the handle at an angle to the plane of the blade, said jaws provided with cutting edges at their protruding ends and mounted for movement of one of said jaws toward and away from the other, said jaws positioned and adapted for manipulation by the hand grasping said handle.

2. A tool for trimming shells and extracting eyes from fruit and for like uses comprising a trimming knife having a handle and an elongated blade projecting therefrom, a cutting edge on said blade, a guard member adjacent the knife blade end of the handle, a pair of forceps-like eye extractor jaws secured to said knife and protruding therefrom at the knife blade side of said guard member, said jaws provided with cutting edges at their protruding ends and mounted for movement of one of said jaws toward and away from the other, and means for manipulating said jaws from the handle side of said guard, said means accessible to the hand grasping said handle.

3. A tool for trimming shells and extracting eyes from fruit and for like uses comprising a handle member, an elongated trimming blade member secured to said handle member, a pair of opposed forceps-like eye extractor jaws secured to one of said members and protruding therefrom while leaving the trimming edge of said blade member unobstructed, said jaws adapted for insertion endwise into a fruit at opposite sides of an eye, for closing together to clamp the eye and for withdrawal and opening to remove and release the clamped eye, and trigger means for controlling the closing and opening of said jaws, the position of said jaws relative to the cutting edge of said blade member and of the trigger means relative to the handle member being such as to permit trimming with said blade and eye extracting with said jaws by manipulation of the hand grasping the handle member without changing the grip of the hand thereon.

4. A tool for trimming shells and extracting eyes from fruit and for like uses comprising a handle member, an elongated trimming blade member secured to said handle member, a pair of opposed forceps-like eye extractor jaws secured to one of said members and protruding therefrom adjacent the hilt of the blade member at an angle to the plane of said member and on the side thereof opposite that normally presented to a fruit in trimming with said blade member, said jaws adapted for insertion endwise into a fruit at opposite sides of an eye, for closing together to clamp the eye and for withdrawal and opening to remove and release the clamped eye, and trigger means for controlling the closing and opening of said jaws and accessible and adapted for operation by pressure of the hand grasping the handle with a grip adapted for trimming shells from the fruit with said blade member.

5. A tool for trimming shells and extracting eyes from fruit and for like uses comprising a handle member, an elongated trimming blade member secured to said handle member, a pair of opposed forceps-like eye extractor jaws secured to one of said members and protruding therefrom adjacent the hilt of the blade member at an angle to the plane of said member and on the side thereof opposite that normally presented to a fruit in trimming with said blade member, one of said jaws being substantially fixed, the other being movable toward and away from said fixed jaw, said movable jaw positioned and adapted for manipulation toward and away from said fixed jaw by the forefinger of the hand grasping the handle member with a grip adapted for trimming shells from the fruit with said blade member.

TADAO TACHI.